United States Patent [19]

Peters et al.

[11] 4,283,297

[45] Aug. 11, 1981

[54] DE-ICING COMPOSITION ON THE BASIS OF ETHYLENE GLYCOL AND/OR PROPYLENE GLYCOL, WATER AND UREA

[75] Inventors: Heinrich Peters, Burghausen; Erich Surma, Winhöring, both of Fed. Rep. of Germany

[73] Assignee: Hoechst Aktiengesellschaft, Fed. Rep. of Germany

[21] Appl. No.: 61,939

[22] Filed: Jul. 30, 1979

[30] Foreign Application Priority Data

Aug. 4, 1978 [DE] Fed. Rep. of Germany ....... 2834225

[51] Int. Cl.³ .................................................. C09K 3/18
[52] U.S. Cl. .......................................... 252/70; 106/13
[58] Field of Search ............................. 252/70; 106/13

[56] References Cited

U.S. PATENT DOCUMENTS

| 3,245,912 | 4/1966 | White ................................ 106/13 X |
| 3,928,221 | 12/1975 | Slater et al. ........................... 252/70 |

FOREIGN PATENT DOCUMENTS

| 969345 | 6/1975 | Canada ..................................... 252/70 |
| 1534176 | 7/1969 | Fed. Rep. of Germany ............. 252/70 |
| 1534173 | 2/1974 | Fed. Rep. of Germany ............. 252/70 |
| 2236811 | 2/1974 | Fed. Rep. of Germany ............. 252/70 |
| 2057577 | 5/1971 | France ....................................... 252/70 |

*Primary Examiner*—Harris A. Pitlick
*Attorney, Agent, or Firm*—Connolly and Hutz

[57] ABSTRACT

Products for rapidly liberating areas covered by ice and/or snow are described, which products are composed as follows (weight %, relative to the total weight of all components):

60 to 79% by weight of propyleneglycol and
  0 to 5% by weight of ethyleneglycol or
  70 to 85% by weight of ethyleneglycol and
  0 to 10% by weight of propyleneglycol.

There are added in both cases
  5 to 15% by weight of water
  5 to 20% by weight of urea and
  1 to 5% by weight of monohydric aliphatic alcohols having from 1 to 7 carbon atoms.

The products are harmless, biologically degradable, non-corrosive and of low flammability.

9 Claims, No Drawings

DE-ICING COMPOSITION ON THE BASIS OF ETHYLENE GLYCOL AND/OR PROPYLENE GLYCOL, WATER AND UREA

The invention relates to a liquid product for thawing ice and/or snow layers on large areas.

Snowfall or ice formation in winter on roads, bridges, sports grounds, airfields and the like (hereinafter called areas covered by ice and/or snow) are a serious handicap for the conditions and safety of traffic. It is therefore known for a long time that such areas can be liberated from ice and snow by means of liquid thawing products, because such products ensure a nearly complete elimination of, especially, ice.

The requirements to be met by a good thawing product are manifold: The materials forming the surfaces of the cited areas, for example concrete, must not be damaged, let alone decomposed. It is furthermore essential that there is no corrosive influence on metals, and exclusion of fire risks due to possible flammability or combustibility of the product must be ensured, too. The product must be composed of substances which are physiologically tolerable for man and animal, and it must be biologically degradable because it may get into the sewage waters. Moreover, the product may not only get into the sewage water, but also onto farming ground, where it must not do significant harm, if any. It is furthermore important to attain rapid thawing, and from the economic viewpoint it is necessary to use an amount of thawing product as small as possible.

In German Offenlegungsschriften Nos. 15 34 173 and 1 534 176, a thawing product is described which consists substantially of monohydric aliphatic low molecular weight alcohols such as isopropanol, aliphatic diols such as ethyleneglycol, and water and urea. This product, although having no corrosive action on concrete and metal, being essentially non-toxic, biologically degradable, nearly harmless for crop plants, and relatively flame- and fire-proof, has the disadvantage of a relatively long thawing time. Furthermore, comparably large amounts of this products are required.

In German Auslegeschrift No. 22 36 811, a solution of from 30 to 70 weight % of propyleneglycol, from 15 to 40 weight % of urea and from 15 to 60 weight % of water is recommended for thawing ice layers on large surfaces. This product, too, does not corrode concrete or metals, it is biologically degradable and relatively flame- and fire-proof. With respect to non-toxicity, as compared to the above thawing product it has the advantage of being physiologically acceptable to a nearly full extent due to the use of propyleneglycol instead of ethyleneglycol. The disadvantage resides, however, in the fact that because of the relatively high amount of urea crop plants can be adversely affected, and the urea may crystallize. Moreover, the thawing speed of this product is still unsatisfactory.

It is therefore the object of this invention to provide a liquid thawing product for liberating areas covered by ice and/or snow, which simultaneously meets all requirements indicated above.

In accordance with the invention, this object has been achieved by a thawing product for liberating areas covered by ice and/or snow which consists of the following components in percent by weight, each relative to their total weight:

60 to 79% by weight of propyleneglycol
0 to 5% by weight of ethyleneglycol
5 to 15% by weight of water
5 to 20% by weight of urea and
1 to 5% by weight of monohydric aliphatic alcohols having from 1 to 7 carbon atoms, or of the following components in percent by weight, each relative to their total weight:

70 to 85% by weight of ethyleneglycol 0 to 10% by weight of propyleneglycol
5 to 15% by weight of water
5 to 20% by weight of urea
1 to 5% by weight of monohydric aliphatic alcohols having from 1 to 7 carbon atoms.

By combining according to the invention propyleneglycol and/or ethyleneglycol, water, urea and a small amount of monohydric aliphatic alcohols having from 1 to 7 carbon atoms, a thawing product for liberating areas covered by ice and/or snow is provided which meets all requirements as described above, and which is especially distinguished by a very short thawing time. This surprisingly short thawing time cannot be explained but by the assumption that the aliphatic alcohols used in accordance with the invention have an unexpected high synergistic effect.

Suitable monohydric aliphatic alcohols are preferably those having from 3 to 5 carbon atoms, especially isopropanol, 2-pentanol and n-butanol. The alcohol amount used is preferably from 1 to 2 weight %, relative to the total weight of the components.

The following compositions (a) to (d) are preferred products of the invention (the percentages by weight are again relative to the total weight of the components):

(a) 62 to 66% by weight of propyleneglycol
13 to 15% by weight of water
18 to 20% by weight of urea
1 to 2% by weight of monohydric aliphatic alcohols having from 3 to 5 carbon atoms,
(b) 65 to 75% by weight of propyleneglycol
2 to 4% by weight of ethyleneglycol
12 to 14% by weight of water
10 to 14% by weight of urea
1 to 2% by weight of monohydric aliphatic alcohols having from 3 to 5 carbon atoms, p1 (c) 70 to 82% by weight of ethyleneglycol
4 to 7% by weight of water
13 to 16% by weight of urea
1 to 2% by weight of monohydric aliphatic alcohols having from 3 to 5 carbon atoms,
(d) 75 to 80% by weight of ethyleneglycol
2 to 6% by weight of propyleneglycol
10 to 15% by weight of water
5 to 8% by weight of urea
1 to 2% by weight of monohydric aliphatic alcohols having from 3 to 5 carbon atoms.

Especially preferred are the compositions (c) and (d).

As propyleneglycol, the commercial 1,2-propyleneglycol is preferably used.

Although the products of the invention have no significant corrosive action, small amounts of usual corrosion inhibitors may be added in order to exclude any possible corrosion risk from the start. A preferred corrosion inhibitor is borax ($Na_2B_4O_7.10H_2O$) which is used in an amount of from 0.2 to 1.0 weight %, preferably 0.4 to 0.6 weight %, relative to the total weight of the components of the thawing product.

The thawing product of the invention for liberating areas covered by ice and/or snow is prepared by intermixing the individual components, for example in a vessel provided with agitator.

The product of the invention is applied to the areas covered by ice and/or snow according to known operation modes with the use of corresponding devices, for example spray guns, nozzles, usual sprinkler trucks or fire engins, or apparatus normally employed for combating pests.

The amount of thawing product of the invention per square meter of area covered by ice and/or snow is generally from 5 to 100 g, preferably 5 to 50 g.

The products of the invention are especially suitable for thawing ice on large ground areas, especially on airfields.

The following examples illustrate the invention. The ice cube test described as follows is carried out using the thawing liquids which are indicated in the Examples and which are prepared by mixing the individual components. This test allows to obtain evidence on the thawing speed of the product in a simple and rapid manner.

60 g each of the thawing products to be tested are charged to 100 ml beakers (height 70 mm, inner diameter 45 mm). The samples are placed in a refrigerator the temperature of which is maintained at −1° to −2° C. As soon as the test liquids have attained this temperature, a cylindrical ice cube having a height of 3 cm and a weight of from 15.5 to 18.5 g is introduced into each of the breakers. These ice cubes having a temperature of −1° C. are taken from a corresponding automatic manufacturing apparatus, weighed and immediately introduced into the liquids to be tested. The time which passes from introduction of the ice cube to its complete dissolution is measured (thawing time). Subsequently, the beaker which was weighed before starting the test is weighed again, and thus the exact weight of the ice cube is determined. In order to obtain comparable results, the calculation is based on precisely 16 g of ice. In a second test series, the thawing time is measured at +20° C. In order to obtain representative values, 5 tests each per sample are carried out at −2° C. and +20° C., respectively. The average value resulting at both temperatures is indicated as follows as thawing time.

COMPARATIVE EXAMPLE 1 (according to German Auslegeschrift No. 2 236 811)

60 weight % of 1,2-propyleneglycol
20 weight % of water
20 weight % of urea
Result: at 20° C.: 37.2 min of thawing time
at −2° C.: 91.3 min of thawing time COMPARATIVE EXAMPLE 2 (according to German Offenlegungsschrift No. 1 534 176)

20 weight % of ethyleneglycol
25 weight % of water
5 weight % of urea
50 weight % of isopropanol
Result:
at 20° C.: 11.3 min of thawing time,
at −2° C.: 96.2 min of thawing time.

EXAMPLE 1

64.5 weight % of 1,2-propyleneglycol
14.0 weight % of water
20.0 weight % of urea
1.5 weight % of isopropanol
Result:
at 20° C.: 31.5 min of thawing time,
at −2° C.: 66.8 min of thawing time.

EXAMPLE 2

66.5 weight % of 1,2-propyleneglycol
4.0 weight % of ethyleneglycol
14.0 weight % of water
14.0 weight % of urea
1.5 weight % of isopropanol
Result:
at 20° C.: 33.2 min of thawing time,
at −2° C.: 70.0 min of thawing time.

EXAMPLE 3

79.5 weight % of ethyleneglycol
5.0 weight % of water
14.0 weight % of urea
1.5 weight % of isopropanol
Result:
at 20° C.: 18.3 min of thawing time
at −2° C.: 68.6 min of thawing time.

EXAMPLE 4

77.5 weight % of ethyleneglycol
2.0 weight % of 1,2-propyleneglycol
14.0 weight % of water
5.0 weight % of urea
1.5 weight % of isopropanol
Result:
at 20° C.: 16.5 min of thawing time,
at −2° C.: 58.0 min of thawing time.

EXAMPLE 5

77.5 weight % of ethyleneglycol
2.0 weight % of 1,2-propyleneglycol
14.0 weight % of water
5.0 weight % of urea
1.5 weight % of n-butanol
Result:
at 20° C.: 30.9 min of thawing time,
at −2° C.: 76.3 min of thawing time.

EXAMPLE 6

77.5 weight % of ethyleneglycol
2.0 weight % of 1,2-propyleneglycol
14.0 weight % of water
5.0 weight % of urea
1.5 weight % of 2-pentanol
Result:
at 20° C.: 27.3 min of thawing time,
at −2° C.: 51.0 min of thawing time.

What is claimed is:

1. Thawing product for liberating areas covered by ice and/or snow which consists of the following components in percent by weight, each relative to their total weight:
60 to 79% by weight of propyleneglycol
0 to 5% by weight of ethyleneglycol
5 to 15% by weight of water
5 to 20% by weight of urea and
1 to 5% by weight of monohydric aliphatic alcohols having from 1 to 7 carbon atoms.

2. Product as claimed in claim 1, consisting of
62 to 66% by weight of propyleneglycol
13 to 15% by weight of water
18 to 20% by weight of urea
1 to 2% by weight of monohydric aliphatic alcohols having from 3 to 5 carbon atoms.

3. Product as claimed in claim 1, consisting of
65 to 75% by weight of propyleneglycol
2 to 4% by weight of ethyleneglycol
12 to 14% by weight of water
10 to 14% by weight of urea
1 to 2% by weight of monohydric aliphatic alcohols having from 3 to 5 carbon atoms.

4. Thawing product for liberating areas covered by ice and/or snow which consists of the following components in percent by weight, each relative to their total weight:
70 to 85% by weight of ethyleneglycol
0 to 10% by weight of propyleneglycol
5 to 15% by weight of water
5 to 20% by weight of urea
1 to 5% by weight of monohydric aliphatic alcohols having from 1 to 7 carbon atoms.

5. Product as claimed in claim 4, consisting of
70 to 82% by weight of ethyleneglycol
4 to 7% by weight of water
13 to 16% by weight of urea
1 to 2% by weight of monohydric aliphatic alcohols having from 3 to 5 carbon atoms.

6. Product as claimed in claim 4, consisting of
75 to 80% by weight of ethyleneglycol
2 to 6% by weight of propyleneglycol
10 to 15% by weight of water
5 to 8% by weight of urea
1 to 2% by weight of monohydric aliphatic alcohols having from 3 to 5 carbon atoms.

7. Product as claimed in any one of claims 1–6, which comprises in addition borax in an amount of from 0.2 to 1.0 weight %, relative to the total weight of the components of the product.

8. A process for thawing ice covers on airfields, which comprises applying a product as claimed in claim 1 to the areas covered by ice.

9. Process as claimed in claim 8, which comprises applying the product in an amount of from 5 to 100 g/m² on the area covered by ice.

* * * * *